Sept. 3, 1957   G. D. STENGER   2,804,786
BORING TOOL HOLDER
Filed July 25, 1956
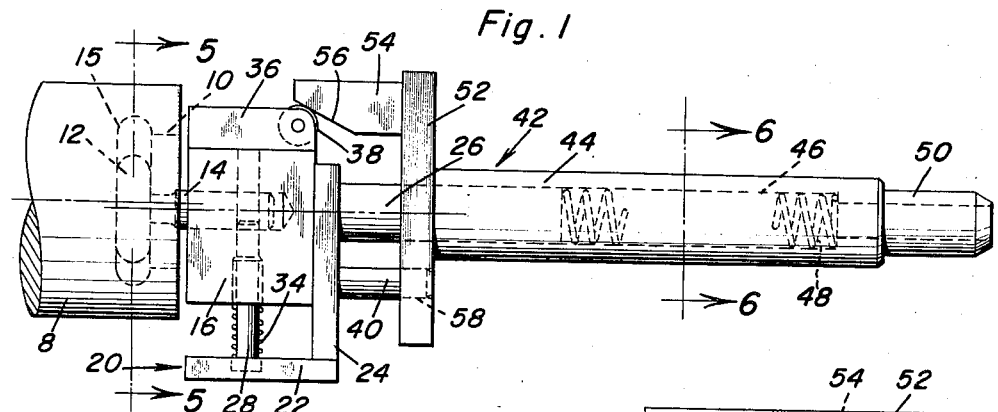
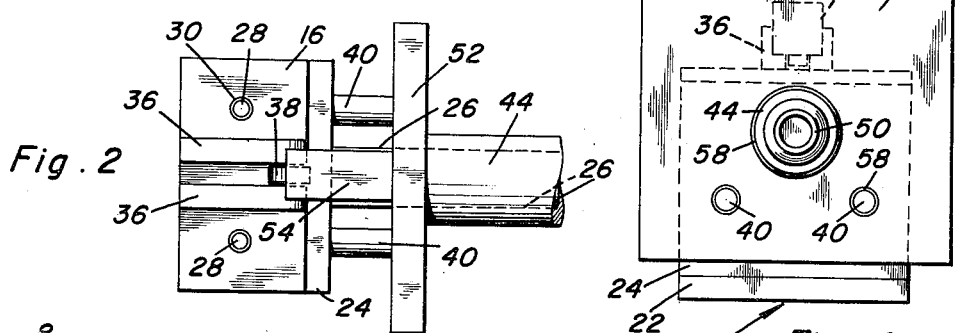
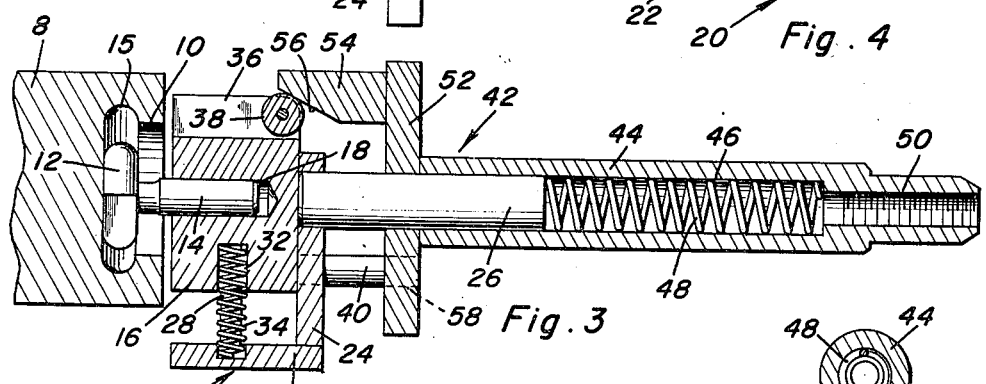
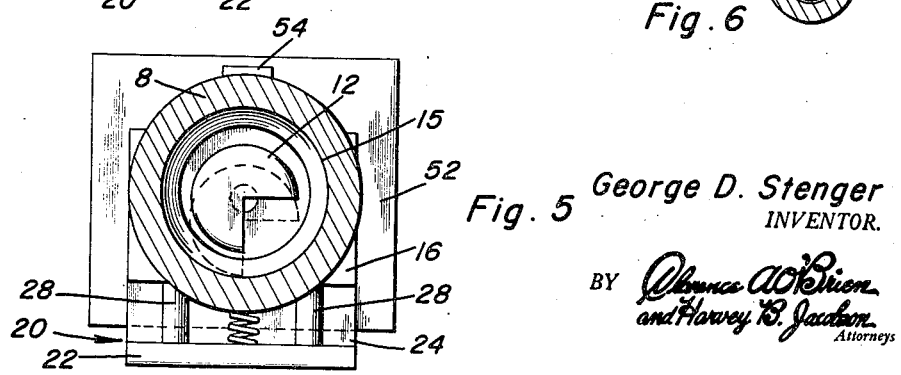
George D. Stenger
INVENTOR.

United States Patent Office 2,804,786
Patented Sept. 3, 1957

2,804,786

BORING TOOL HOLDER

George D. Stenger, Detroit, Mich., assignor of fifty percent to Morris D. Stenger, Detroit, Mich.

Application July 25, 1956, Serial No. 599,944

3 Claims. (Cl. 77—58)

The present invention relates to an improved holding device for a boring tool used, for example, in recessing and counterboring an intended axial end portion of a piece of stock or an equivalent workpiece.

More specifically, the invention has to do with a tool holder and automatic adjusting device for the cutting or boring tool wherein said device is constructed to permit it to be mounted on and used in conjunction with a tool post on a lathe wherein, for example, the stock or workpiece is rotated and the tool holder is pressed endwise into axial boring relationship in respect to the end of the rotating stock.

An object of the invention is to structurally, functionally and otherwise improve upon similarly constructed and performing tool holders in the field of endeavor under consideration and, in doing so, to thus provide an adaptable construction which will comply, generally speaking with the manufacturing requirements and economies of manufacturers and will effectually meet the needs of those called upon to use boring and cutting tools.

A further objective, generally speaking, is to improve upon and reduce the number of parts entering into the over-all combination, thereby not only increasing the efficiency of the structure as an entity, but also rendering the same less costly to manufacture, to repair and adjust and to otherwise simplify factors of assembling and sale.

Other and more explicit objects will become more readily apparent from the following description and the accompanying sheet of illustrative, but not restrictive, drawings.

In the drawings, wherein like numerals are employed to designate like parts throughout the views:

Fig. 1 is an elevational view showing an end of the workpiece or stock, the tool holder and the manner in which the same is constructed and used;

Fig. 2 is a fragmentary top plan view of the left-hand end portion (Fig. 1) of the tool holder;

Fig. 3 is a lengthwise central section through the construction seen in Fig. 1 with parts in section and elevation;

Fig. 4 is an end elevation of the construction seen in Fig. 1 observing the same in a direction from right to left;

Fig. 5 is a section on the line 5—5 of Fig. 1; and

Fig. 6 is a section on the line 6—6 of Fig. 1.

Referring now to the drawings and particularly to Figs. 1 and 3, the workpiece or stock, that is, an end portion thereof, is denoted by the numeral 8 and in the end which is to be counterbored or recessed there is the duly bored hole 10 for passage of of the suitably constructed boring or cutting tool 12, this carried by the shank 14. Observing these two figures the counterbore which is here complete is denoted by the numeral 15.

The tool holder comprises a tool block 16 having a socket 18 therein into which the tool shank 14 is fitted in the manner shown. The tool block cooperates with and is mounted on a bracket structure 20 which is characterized by a horizontal plate or shelf 22 and a vertical plate 24 the latter being provided in its upper portion with a rearwardly extending drawbar 26. Rising from and fixed to the shelf 22 are upstanding guide and assembling pins 28 telescoping into bores 30 provided therefor in the block. The block is provided in its bottom with a socket 32 to accommodate a cushioning and return spring 34 the lower end of which is suitably anchored on the shelf 22 as shown in Fig. 3. The top of the block is provided with upstanding flanges 36 carrying an idling roller 38 mounted for rotation between the flanges. The plate 24 is also provided with a pair of rigid laterally or horizontally disposed guide and stabilizing pins 40. The bracket 20 with all of its described parts cooperates with the camming means 42. This comprises a sleeve or shank 44 in the bore 46 by which is provided a cushioning spring, preferably a coil spring 48. The right-hand end of the sleeve is reduced and screw-threaded as at 50 to adapt the construction to be mounted in a tool post or other equivalent tool holding means on the lathe (not shown). Fixedly mounted on the sleeve is a head plate 52 which is centrally apertured and aligned with the sleeve to permit reciprocation of the drawbar 26. On the forward or leading end of the plate there is an outstanding fixed lug 54 having a beveled surface 56 which provides a cam and which has cam coaction with the peripheral portion of the freely turnable roller 38. Obviously, as the means 42 is fed against the tension of the spring 48 and the left end face of block 16 encounters a fixed position abutment such as the adjacent end face of the work, means 42 moves relative to the drawbar 26, the camming lug 54 comes into cooperating contact with the cam roller 38 and thus the tool block 16 rides down and off-centers the tool so that it reams and bores the recess or counterbore 16 referred to.

It will be noticed that the lower portion of the head plate 52 has guide holes 58 therein to accommodate the stabilizing and guide pins 40 on the shelf part of the bracket, more specifically the plate 24 thereof.

The foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention as claimed.

What is claimed as new is as follows:

1. In a boring tool holder of the class described, in combination, a sleeve containing a spring and having a head plate with a laterally projecting lug, said lug having a beveled surface constituting a cam, a bracket having a drawbar mounted for reciprocation in said sleeve and with one end cooperating with said spring, a tool block mounted for operation on said bracket and having a cam roller with which said cam is cooperatively in contact.

2. The structure defined in claim 1 wherein said bracket embodies horizontal and vertical plates, said drawbar being carried by said vertical plate, guide pins carried by said vertical plate, said head plate having guide openings in which said guide pins are operable.

3. The structure defined in claim 1 and wherein said bracket embodies horizontal and vertical plates, said drawbar being carried by said vertical plate, guide pins carried by said vertical plate, said head plate having guide openings in which said guide pins are operable, said block having bores therethrough and the horizontal plate of said bracket having stabilizing pins extending slidably into said bores, and a coil spring interposed between said horizontal plate and block.

References Cited in the file of this patent

UNITED STATES PATENTS

| 1,193,426 | Rollinson | Aug. 1, 1916 |
| 2,247,284 | Young | June 24, 1941 |
| 2,601,541 | Maxwell | June 24, 1952 |